United States Patent
Renson et al.

(10) Patent No.: US 10,434,819 B2
(45) Date of Patent: Oct. 8, 2019

(54) PROTECTOR SHIELD FOR A SIDEWALL OF A MOTOR VEHICLE TIRE, AND A WHEEL ASSEMBLY FOR THIS VEHICLE INCORPORATING IT

(71) Applicant: Hutchinson Industries, Inc., Wilmington, DE (US)

(72) Inventors: Christopher Renson, Langhorne, PA (US); Anne Audrey Tan, La Garenne Colombes (FR)

(73) Assignee: Hutchinson Industries, Inc., Wilmington, DE (US)

( * ) Notice: Subject to any disclaimer, the term of this patent is extended or adjusted under 35 U.S.C. 154(b) by 25 days.

(21) Appl. No.: 14/648,469

(22) PCT Filed: Nov. 27, 2013

(86) PCT No.: PCT/US2013/072202
§ 371 (c)(1),
(2) Date: May 29, 2015

(87) PCT Pub. No.: WO2014/085569
PCT Pub. Date: Jun. 5, 2014

(65) Prior Publication Data
US 2015/0298499 A1 Oct. 22, 2015

Related U.S. Application Data

(60) Provisional application No. 61/731,847, filed on Nov. 30, 2012.

(51) Int. Cl.
*B60B 7/04* (2006.01)
*B60B 7/01* (2006.01)
(Continued)

(52) U.S. Cl.
CPC .............. *B60B 7/01* (2013.01); *B60B 7/0026* (2013.01); *B60B 7/04* (2013.01); *B60B 7/14* (2013.01);
(Continued)

(58) Field of Classification Search
CPC ........... B60B 7/01; B60B 7/0026; B60B 7/14; B60B 7/04; B60B 7/06; B60B 2900/212;
(Continued)

(56) References Cited

U.S. PATENT DOCUMENTS 3,065,995 A * 11/1962 Beacher ................. B60B 11/10
152/312
4,235,271 A * 11/1980 Olsen ....................... B60B 7/01
152/154
(Continued)

FOREIGN PATENT DOCUMENTS

DE  100 12 468 A1    9/2001
DE    10012468 A1 *  9/2001  ............... B60B 7/01
(Continued)

OTHER PUBLICATIONS

International Search Report and Written Opinion for Application No. PCT/US2013/072202 dated Mar. 27, 2014.

*Primary Examiner* — Scott A Browne
(74) *Attorney, Agent, or Firm* — Alston & Bird LLP

(57) ABSTRACT

A protector shield for a sidewall of a motor vehicle tire, and to a wheel assembly for a motor vehicle incorporating this protector shield is provided. This protector annular shield is configured to be mounted on a wheel rim receiving said tire. The protector shield includes at least two concentric shield rings having a first shield ring and a second shield ring which are axially juxtaposed and which respectively include, substantially arranged end to end in a circumferential direction, a plurality of first arcuate sectors and a
(Continued)

plurality of second arcuate sectors which angularly overlap each other, so that every two consecutive second sectors are substantially arranged end to end axially in front of a first sector short of both ends of this first sector.

18 Claims, 11 Drawing Sheets

(51) Int. Cl.
*B60B 7/00* (2006.01)
*B60B 7/14* (2006.01)
*B60C 13/00* (2006.01)
*B60B 7/06* (2006.01)

(52) U.S. Cl.
CPC ........... *B60B 7/06* (2013.01); *B60B 2900/212* (2013.01); *B60B 2900/325* (2013.01); *B60B 2900/3312* (2013.01); *B60B 2900/721* (2013.01); *B60C 13/002* (2013.01); *B60Y 2200/20* (2013.01); *B60Y 2200/41* (2013.01)

(58) Field of Classification Search
CPC ...... B60B 2900/3312; B60B 2900/325; B60B 2900/721; B60B 7/00; B60Y 2200/41; B60Y 2200/20; B60C 13/002

USPC ....... 301/37.22, 37.23, 37.102, 5.301, 5.302, 301/5.303
See application file for complete search history.

(56) References Cited

U.S. PATENT DOCUMENTS

| 7,566,102 B2 * | 7/2009 | Guile ................... B60B 19/003 301/5.1 |
| 2009/0315389 A1 | 12/2009 | Seradarian et al. |
| 2010/0060072 A1 * | 3/2010 | Rieger ..................... B60B 7/01 301/37.23 |
| 2010/0066155 A1 * | 3/2010 | Seradarian ............... B60B 7/01 301/37.22 |
| 2013/0147255 A1 * | 6/2013 | Rider ................... B60B 25/045 301/23 |

FOREIGN PATENT DOCUMENTS

| FR | 1356730 A * | 3/1964 | .............. B60B 7/01 |
| GB | 195910 A * | 4/1923 | .............. B60B 7/00 |
| GB | 511 056 A | 8/1939 | |
| JP | S60 164403 U | 10/1985 | |
| WO | WO 7900425 A1 * | 7/1979 | .............. B60B 7/01 |

\* cited by examiner

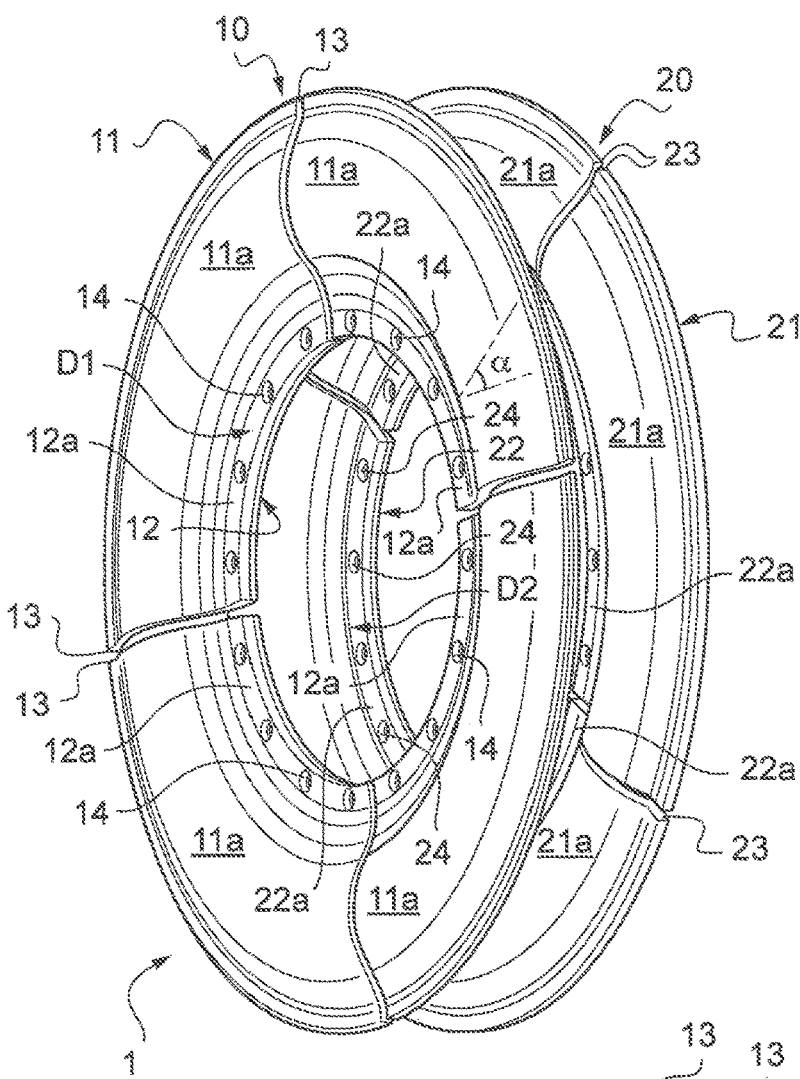
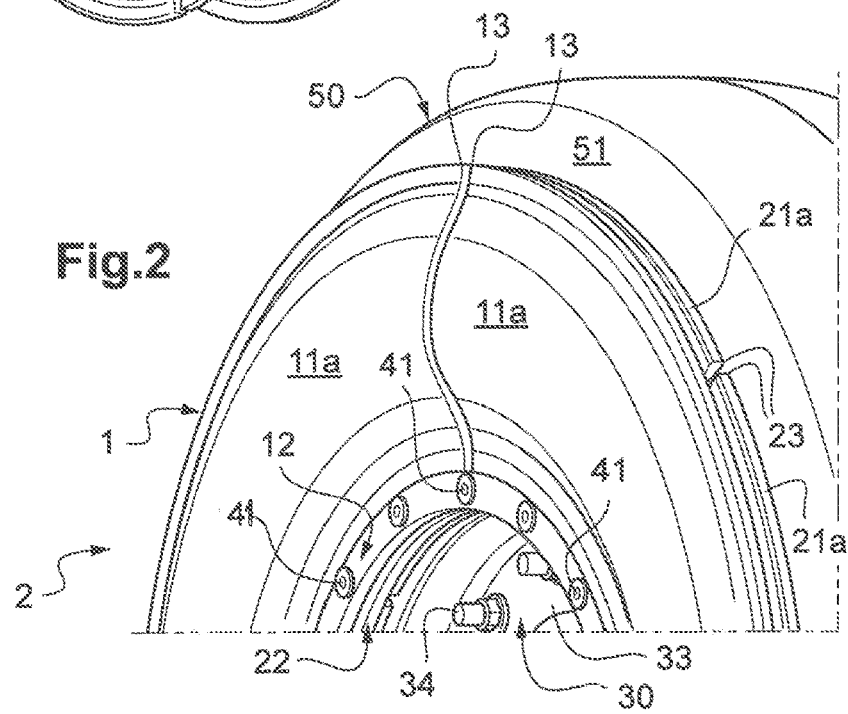
Fig.1
Fig.2

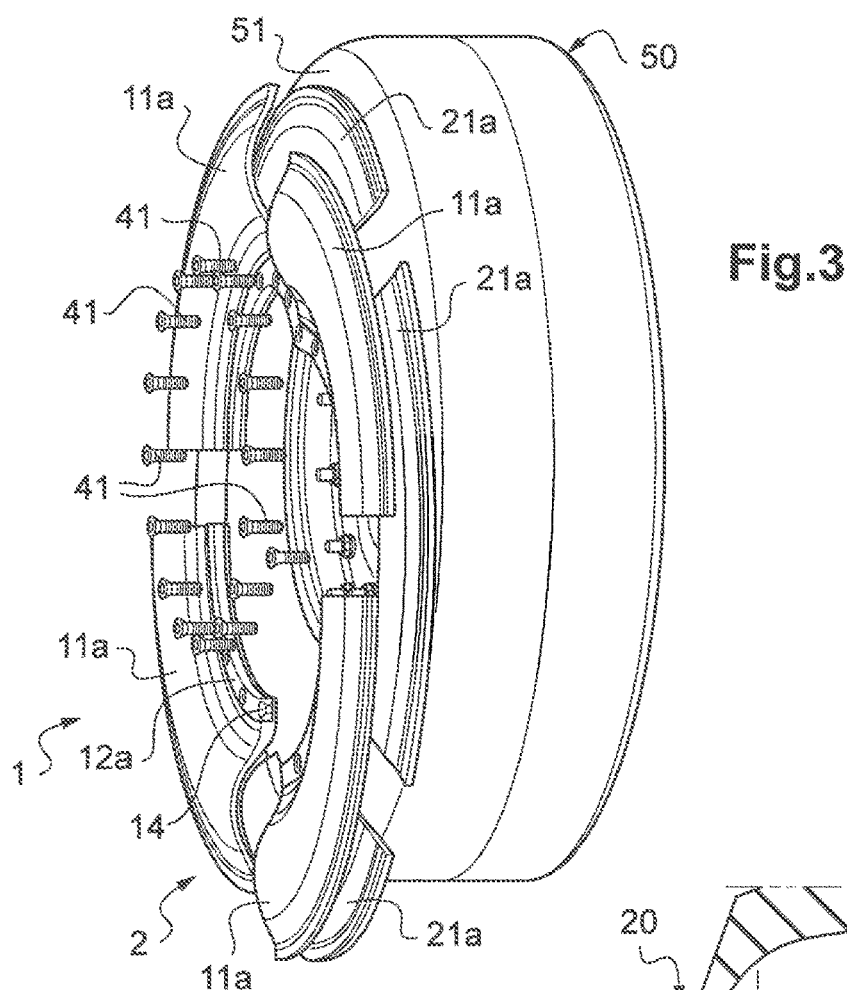
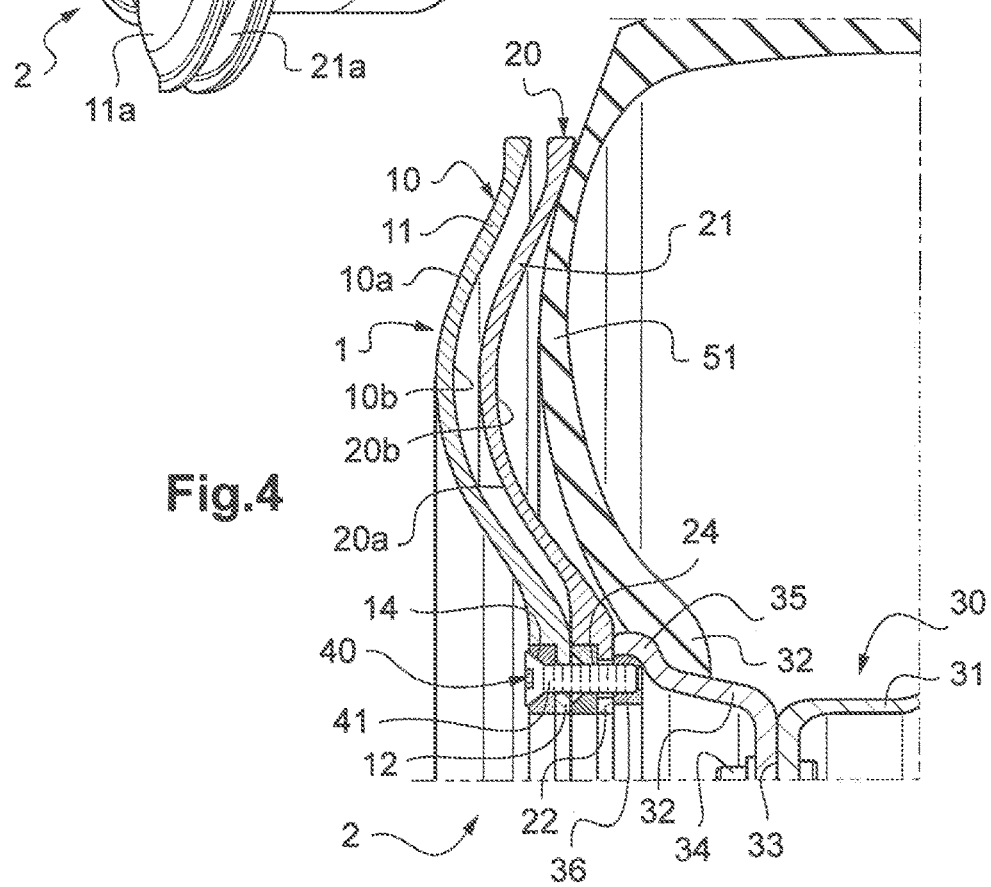

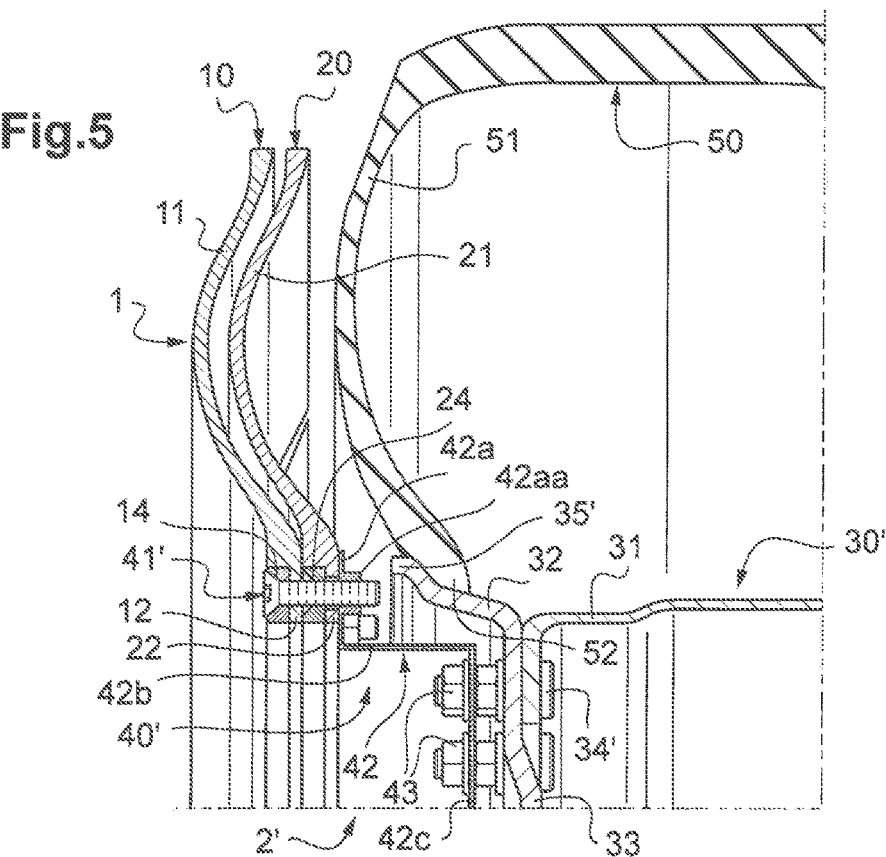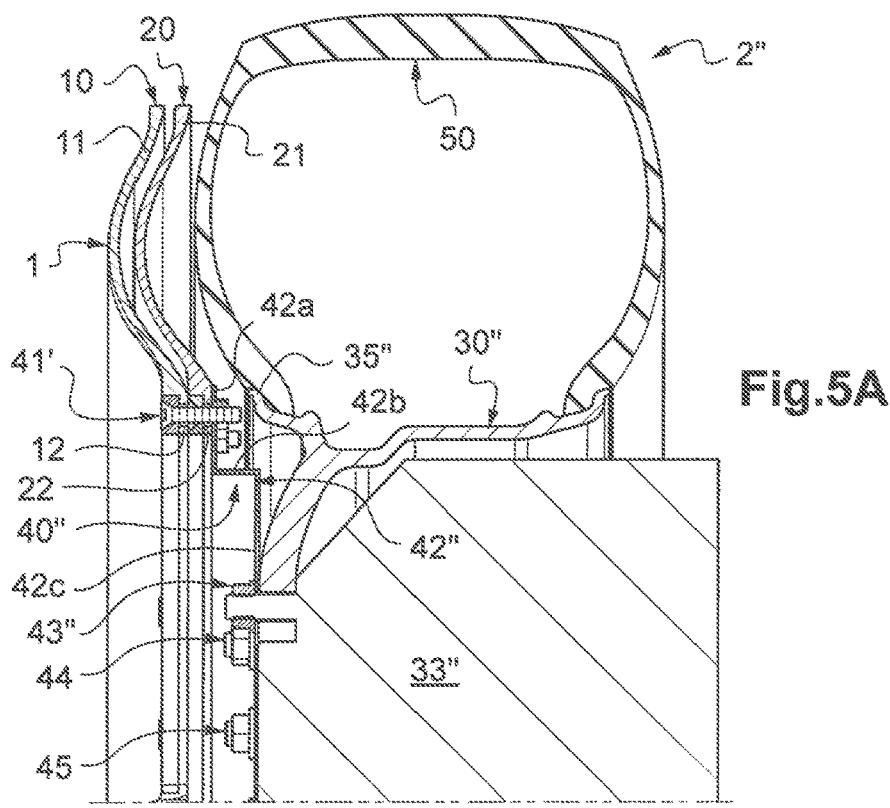

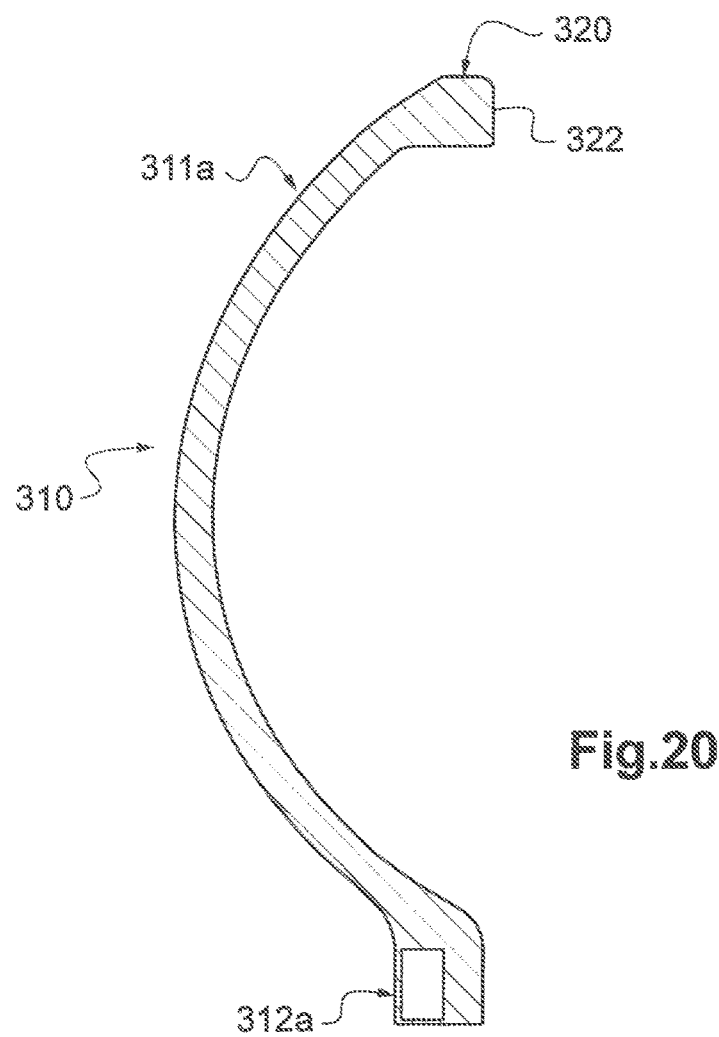
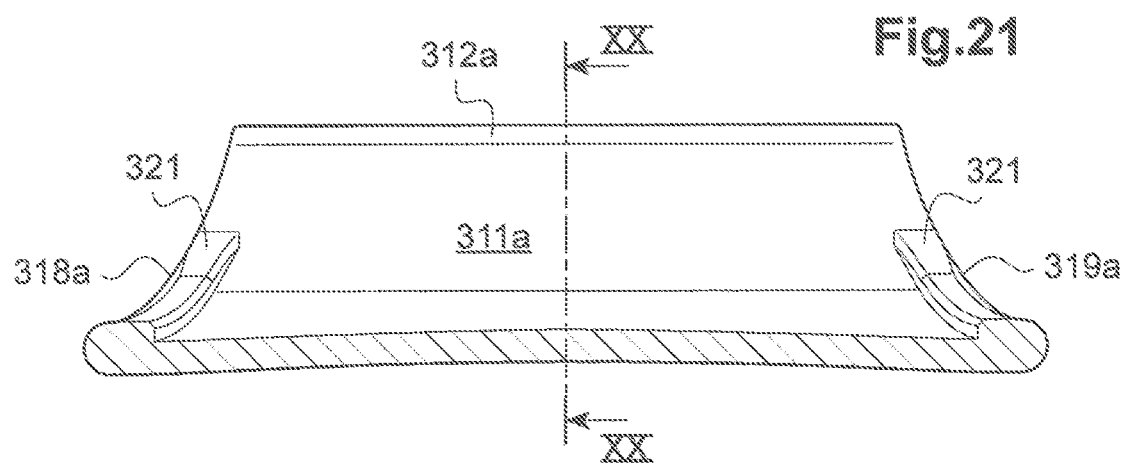

PROTECTOR SHIELD FOR A SIDEWALL OF A MOTOR VEHICLE TIRE, AND A WHEEL ASSEMBLY FOR THIS VEHICLE INCORPORATING IT The present invention relates to a protector shield for a sidewall of a motor vehicle tire, and to a wheel assembly for a motor vehicle incorporating this protector shield. The invention particularly but not exclusively concerns the protection against rocks, stones, scrap metal or any other objects on the ground, of large size tires of heavy vehicles, such as tires for industrial vehicles including civil engineering vehicles, earthmovers or military vehicles which operate off-the-road.

BACKGROUND OF THE INVENTION

It is known to protect outer sidewalls of certain tires by protector annular shields each mounted on the wheel rim receiving the tire, as for example disclosed by Patent Application US 2009/0315389 A1 which presents such a protector shield consisting of one curved shield ring in particular for fire protection against flames or flammable substances.

Patent Application US 2010/0060072 A1 discloses a protector shield formed by a ring comprising a plurality of spaced arcuate sectors which are independently connected by respective radial springs to a holder attached to the wheel rim. Similarly, Patent GB-A-511,056 discloses such a protector shield ring formed of arcuate sectors resiliently mounted on the wheel rim.

These separate and independent arcuate sectors allow to easy the manufacturing process and the replacement cost of the protector shield for large size tires of civil engineering vehicles, for instance, compared to a protector shield made of a single circumferential ring. Nonetheless, a major drawback of these protector shields comprising such ring sectors which are not connected together is that these sectors may be deformed upwards in contact with rocks or stones, so that the facing tire sidewall cannot be fully protected in such a case.

OBJECTS AND SUMMARY OF THE INVENTION

It is an object of the present invention to provide a protector annular shield for a sidewall of a motor vehicle tire, said shield being configured to be mounted on a wheel rim receiving said tire, which efficiently protects the tire sidewall against impacts of rocks, stones, scrap metal or any other objects on the ground susceptible to perforate or damage the sidewall due to significant loads or continuous wear on it.

It is also an object of the present invention to provide such a protector shield which is easy to manufacture for large size tires of heavy vehicles, such as tires for civil engineering vehicles or earthmovers.

It is a further object of the present invention to provide such a protector shield which is easily replaceable, in case the shield is partly damaged by such impacts.

For this purpose, the protector annular shield of the invention comprises at least two concentric shield rings comprising a first shield ring and a second shield ring which are axially juxtaposed and which respectively comprise, substantially arranged end to end in a circumferential direction, a plurality of first arcuate sectors and a plurality of second arcuate sectors which angularly overlap each other, so that every two consecutive first or second sectors are substantially arranged end to end axially in front of a second or first sector short of both ends of this second or first sector, respectively (i.e. so that the two ends of any first or second sector are not positioned axially in front of two ends of a facing second or first sector, respectively).

By "substantially arranged end to end", it is meant in the present description to encompass:
 an abutting arrangement end to end without any interstice nor any overlap between two consecutive arcuate sectors, or
 a nearly abutting arrangement end to end with an interstice or slight overlap between two consecutive arcuate sectors without mechanical connection nor any contact between these consecutive sectors, or else
 an abutting arrangement end to end with a slight overlap between two consecutive arcuate sectors secured by a mechanical connection between these consecutive sectors for instance obtained by respective mutually engaging shoulders provided in these sectors.

It is to be noted that this at least double layer of shield rings allows to efficiently protect the tire sidewall in operation, due to the juxtaposed axially second sectors (inner sectors) which may palliate any deformation or damage of one or several axially first sectors (outer sectors), and that the overlapping sectors of these at least two rings further improve this protection by palliating any damage or deformation undergone by any axially first outer sector. In addition, the first sectors advantageously prevent the second sectors from lifting up.

It is also to be noted that this inventive protector shield is easy to manufacture for large size tires, due to the sectors' size which is limited for each shield ring.

It is further to be noted that this inventive protector shield is easily replaceable, since it is possible to replace just one or several damaged first and/or second sectors.

Preferably, said plurality of n first arcuate sectors and said plurality of m second arcuate sectors, where n and m are identical or different, are arranged in angularly staggered rows, defining an overlap angle between the first sectors and the second sectors. Said overlap angle may then be equal to $180°/n$, with n being the number of said first sectors and also the number m of said second sectors (n=m in this preferred case).

According to another feature of the invention, each of said plurality of first arcuate sectors and each of said plurality of second arcuate sectors may be separately (i.e. independently) mounted on said wheel rim, so that each first sector and each second sector are able to be dismounted from said wheel rim without having to dismount the other first sectors nor the other second sectors, respectively. It is nonetheless to be noted that in order to dismount a second sector, several first sectors firstly have to be dismounted.

Advantageously, each of said plurality of first arcuate sectors may comprise a first flexible arcuate protecting part and, radially inwards, a first rigid arcuate clamping part which has a first median diameter and with which this first protecting part is integrally formed, and each of said plurality of second arcuate sectors may comprise a second flexible arcuate protecting part and, radially inwards, a second rigid arcuate clamping part which has a second median diameter for example identical to said first median diameter and with which this second protecting part is integrally formed, the first arcuate clamping parts and the second arcuate clamping parts, when arranged end to end, forming two concentric first and second clamp rings attached together and configured to be attached to said wheel rim by fastening means.

According to a preferred embodiment of the invention, said fastening means may comprise a plurality of threaded fasteners traversing a plurality of aligned through holes provided in each of said first arcuate clamping parts and of said second arcuate clamping parts.

Also advantageously, the protector shield may have an outer convex surface defined by said first shield ring and an inner concave surface defined by said second shield ring.

According to another feature of the invention, said plurality of first arcuate sectors and said plurality of second arcuate sectors may be substantially arranged end to end in an abutting manner and devoid of connection means between the first sectors and also between the second sectors (i.e. devoid of connection means other than the consecutive first sectors and second sectors themselves). By way of an example, the consecutive first sectors and/or second sectors may incorporate connection means by an overlapping abutment thanks to respective mutually engaging shoulders integrally formed in end edges of these consecutive sectors.

Advantageously according to this last inventive example, at least several of said plurality of first arcuate sectors and/or at least several of said plurality of second arcuate sectors may be arranged in a mutual overlapping abutment by engaging shoulders integrally formed in end edges of the consecutive arcuate sectors. Alternatively, at least several of said plurality of first arcuate sectors and/or at least several of said plurality of second arcuate sectors may be substantially arranged in a mutual joining abutment by sloping end edges of each arcuate sector, which end edges define symmetrical tapered edges which are beveled to substantially join together the consecutive arcuate sectors at their respective thinnest ends.

A wheel assembly for a motor vehicle according to the invention comprises a wheel rim, a tire having beads respectively mounted against axially inner and outer flanges of said rim, and a protector shield mounted adjacent said rim which is as defined above.

According to a first embodiment of the invention:
  each of said plurality of first arcuate sectors comprises a first flexible arcuate protecting part and, radially inwards, a first rigid arcuate clamping part which has a first median diameter and with which this first protecting part is integrally formed,
  each of said plurality of second arcuate sectors comprises a second flexible arcuate protecting part and, radially inwards, a second rigid arcuate clamping part which has a second median diameter for example identical to said first median diameter and with which this second protecting part is integrally formed, and
  the first arcuate clamping parts and the second arcuate clamping parts, when arranged end to end, form two concentric first and second clamp rings which are attached together and to said wheel rim by fastening means, these clamp rings being directly attached to said axially outer flange or to an adapter ring of the wheel rim integral with this flange so that the shield is in direct contact with the wheel rim.

Said fastening means of this first embodiment may consist of a plurality of axial threaded fasteners traversing axially aligned through holes provided in each of said first arcuate clamping parts and second arcuate clamping parts and further axially traversing said flange or said adapter ring.

According to a second embodiment of the invention in which the wheel rim comprises several pieces fixed together in a radial junction zone (i.e. for a multi-piece wheel rim):
  each of said plurality of first arcuate sectors comprises a first flexible arcuate protecting part and, radially inwards, a first rigid arcuate clamping part which has a first median diameter and with which this first protecting part is integrally formed,
  each of said plurality of second arcuate sectors comprises a second flexible arcuate protecting part and, radially inwards, a second rigid arcuate clamping part which has a second median diameter for example identical to said first median diameter and with which this second protecting part is integrally formed, and
  the first arcuate clamping parts and the second arcuate clamping parts, when arranged end to end, form two concentric first and second clamp rings which are attached together and to said wheel rim by fastening means, these clamp rings being attached to an intermediate annular support member which is attached to said junction zone of the wheel rim, so that the shield is axially distant from an adjacent axially outer rim flange of the wheel rim.

According to a third embodiment of the invention in which the wheel rim is either of the single piece or multi-piece type, the wheel rim being fixed to a wheel hub:
  each of said plurality of first arcuate sectors comprises a first flexible arcuate protecting part and, radially inwards, a first rigid arcuate clamping part which has a first median diameter and with which this first protecting part is integrally formed,
  each of said plurality of second arcuate sectors comprises a second flexible arcuate protecting part and, radially inwards, a second rigid arcuate clamping part which has a second median diameter for example identical to said first median diameter and with which this second protecting part is integrally formed, and
  the first arcuate clamping parts and the second arcuate clamping parts, when substantially arranged end to end, form two concentric first and second clamp rings which are attached together and to said wheel hub by fastening means, these clamp rings being attached to an intermediate annular support member which is attached to the wheel hub, so that the shield is axially distant from an adjacent axially outer rim flange of the wheel rim.

Said fastening means of this second or third embodiment may comprise:
  said intermediate annular support member having an axially outer circumferential radial portion extended radially inwards by a circumferential connecting portion located radially under said flange, which connecting portion is extended radially inwards by an axially inner circumferential radial portion,
  first axial threaded fasteners traversing axially aligned through holes provided in each of said first arcuate clamping parts and second arcuate clamping parts and in said axially outer circumferential radial portion, and
  second axial threaded fasteners attaching said axially inner circumferential radial portion to said wheel rim (i.e. either to said junction zone thereof in said second embodiment or to said wheel hub to which the wheel rim is connected in said third embodiment).

BRIEF DESCRIPTION OF THE DRAWINGS

Other advantages, characteristics, and details of the invention appear from the following additional description with reference to the accompanying drawings, given purely by way of example, and in which:

FIG. 1 is a lateral perspective view of a protector shield according to an exemplary embodiment of the invention;

FIG. 2 is an enlarged fragmentary perspective view of the protector shield of FIG. 1 fastened to a wheel rim according to the first embodiment of the invention, with a tire mounted on this rim to form a complete wheel assembly;

FIG. 3 is an exploded lateral perspective view of the wheel assembly of FIG. 2 incorporating the protector shield according to the first embodiment of the invention;

FIG. 4 is a fragmentary half-view in axial section of this wheel assembly incorporating this protector shield according to the first embodiment of the invention;

FIG. 5 is a fragmentary half-view in axial section of another wheel assembly incorporating the same protector shield fastened to the wheel rim according to the second embodiment of the invention;

FIG. 5A is a fragmentary half-view in axial section of another wheel assembly incorporating the same protector shield fastened to a wheel hub according to the third embodiment of the invention;

FIG. 20 is a fragmentary half-view in axial section along the median plane XX-XX of FIG. 21 of an arcuate sector of a first or second shield ring for a protector shield according to a variant embodiment of the invention, and FIG. 21 is a rear view partially in perspective and in section of the arcuate sector of FIG. 20, but not showing the outer circumferential edge of the arcuate sector which is visible in FIG. 20.

MORE DETAILED DESCRIPTION

Figure 6:
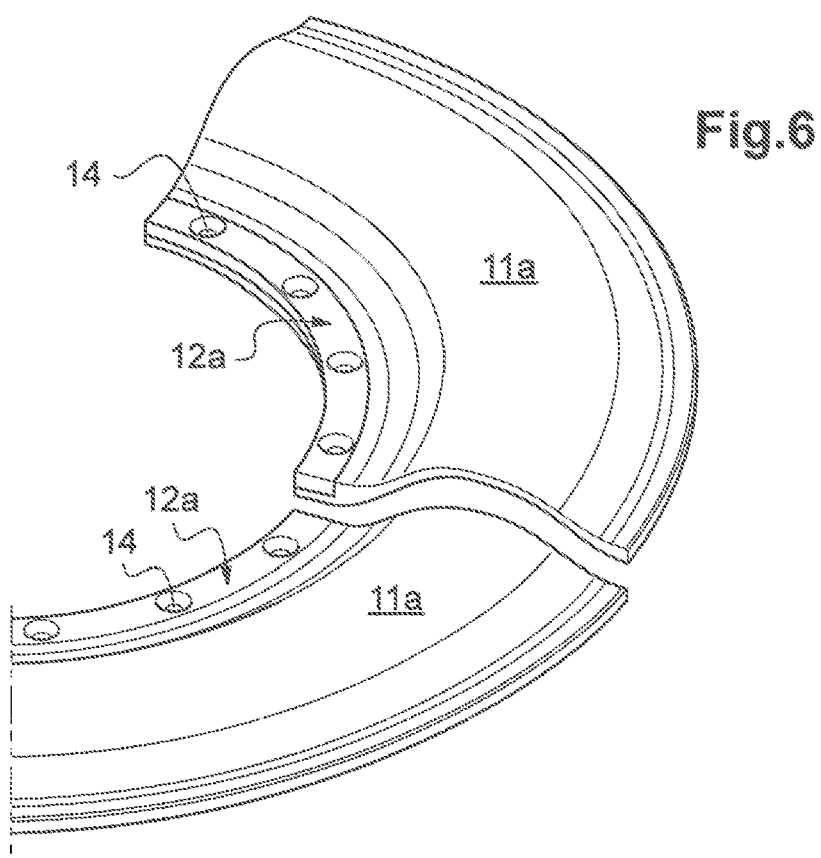
FIGS. 6 and 7 are enlarged fragmentary perspective front views, respectively exploded and assembled, of two consecutive arcuate sectors of a first or second shield ring for a protector shield according to a variant embodiment of the invention.

The expression "front view" and "rear view" applied to the inventive arcuate sectors described below respectively refer to views showing the outer convex surface and the inner concave surface of these sectors when mounted on the wheel rim.

The protector shield 1 of the exemplary embodiment visible in FIGS. 1 to 5 comprises two curved concentric shield rings 10 and 20 comprising a first axially outer shield ring 10 and a second axially inner shield ring 20 which are axially juxtaposed.

The first shield ring 10 comprises a first flexible protecting part 11 and, radially and axially inwards, a first rigid clamp ring 12 which has a first median diameter D1 and with which this first protecting part 11 is integrally formed, so that the radially inner circumferential edge of the first protecting part 11 is fixedly joined to the first clamp ring 12. The first shield ring 10 has an axially outer surface 10a which is convex and an axially inner surface 10b which is concave (see FIG. 4). As visible in FIG. 1, the first protecting part 11 is made of n (in this example, n=4) arcuate flexible sectors 11a which are separately fixedly joined to the same number n of arcuate rigid clamping parts 12a (preferably by overmolding each arcuate rigid clamping part 12a with a compression of the material of this flexible arcuate protecting part 11a), so that the arcuate flexible sectors 11a are arranged end to end substantially in mutual abutment just as the radially underlying arcuate rigid clamping parts 12a to obtain the flexible sectors 11a which are fixedly joined to the first clamp ring 12 while not being connected together.

The second shield ring 20 may present a structure, geometry, external diameter and/or thickness identical or different from that of the first shield ring 10, and comprises a second flexible protecting part 21 and, radially and axially inwards, a second rigid clamp ring 22 which has a second median diameter D2 identical to D1 and with which this second protecting part 21 is integrally formed, so that the radially inner circumferential edge of the second protecting part 21 is fixedly joined to the second clamp ring 22. The second shield ring 20 also has an axially outer convex surface 20a and an axially inner concave surface 20b for instance identical to those of the first shield ring 10 (see FIG. 4). As visible in FIG. 1, the second protecting part 21 is made of m (in this example, m=n=4) arcuate flexible sectors 21a which are separately fixedly joined to the same number m of arcuate rigid clamping parts 22a (preferably by overmolding as explained above), so that the arcuate flexible sectors 21a are arranged end to end substantially in mutual abutment just as the arcuate rigid clamping parts 22a to obtain the flexible sectors 21a which are fixedly joined to the second clamp ring 22 while not being connected together.

Each of the first and second rigid clamp rings 12 and 22 may be made of a plastic or metal material, and each of the first and second flexible protecting parts 11 and 21 may be based on at least one elastomer (i.e. either a rubber such as a diene elastomer or a polyurethane rubber for instance, or a thermoplastic elastomer) and is optionally reinforced by at least one reinforcing layer such as a woven or nonwoven fabric (e.g. of aramide), a fiberglass mat or mesh or a metal layer. Thus, an inventive protector shield may be such that the second flexible protecting part 21 is devoid of any reinforcement, whereas the first flexible protecting part 11 is reinforced by this at least one reinforcing layer.

According to instant invention, the first and second arcuate flexible sectors 11a and 21a angularly overlap each other and form in this exemplary embodiment staggered rows, with an overlap angle cc between the first and second sectors 11a and 21a of 180°/n ($\pi/n$) which is equal to 45° ($\pi/4$) in this example of four first and second sectors 11a and 21a, so that the abutment line between the ends 23 of every two consecutive second sectors 21a is located axially in front of a first sector 11a short of both ends 13 thereof.

As visible in FIGS. 2 to 5, the protector shield 1 is fastened to a wheel rim 30 or 30' by fastening means 40 or 40' which attach together the first and second clamp rings 12 and 22 and which comprise axial bolts 41 or 41' traversing aligned through holes 14 and 24 provided in each of the first and second arcuate clamping parts 12a and 22a.

Specifically, the wheel assembly 2 according to the first embodiment of FIG. 4 comprises:
- a metallic wheel rim 30 which consists in this example of two pieces 31 and 32 attached together in a known manner at a radial junction zone 33 by circumferentially spaced rim bolts 34, and which comprises axially inner and outer flanges (only the outer flange 35 is visible) defining respective seats,
- a pneumatic tire 50 having two sidewalls (only the outer sidewall 51 is visible in FIG. 4) ending with inner and outer beads respectively mounted against the inner and outer flanges (only the outer bead 52 is visible with the outer flange 35), and
- the protector shield 1 substantially extending along the radial height of the outer sidewall 51, in such a manner that both shield rings 10 and 20 are axially juxtaposed with their respective clamp rings 12 and 22 being in mutual contact thanks to the axial bolts 41 that clamp them via the through holes 14 and 24 and that further partially traverse an adapter ring 36 extending the outer flange 35 radially inwards to attach both shield rings 10 and 20 directly to the wheel rim 30.

The wheel assembly 2' according to the second embodiment of FIG. 5 only differs from that of FIG. 4, in that the clamp rings 12 and 22 are attached by first axial bolts 41' to an intermediate annular support member 42 which is itself attached by second axial bolts 43 to the junction zone 33 of the wheel rim 30', so that the shield 1 is not in contact with the outer flange 35' but axially distant from it. Specifically, the support member 42 (preferably made of metal or plastic) has an axially outer circumferential radial portion 42a extended radially inwards by a circumferential axial connecting portion 42b located radially under the outer flange 35', which connecting portion 42b is extended radially inwards by an axially inner circumferential radial portion 42c. As visible in FIG. 5, the first bolts 41' traverse the axially aligned through holes 14 and 24 provided in both clamp rings 12 and 22 and also through holes 42aa formed in the outer radial portion 42a of the support member 42, and the second bolts 43 attach the inner radial portion 42c of the support member 42 to the junction zone 33 of the wheel rim 30' thanks to the bolts 34' used to attach together the two pieces 31 and 32 thereof.

It is to be noted that the protector shield 1 according to this second embodiment could alternatively be mounted on a wheel rim of the single piece, three-piece type or more generally on a multi-piece type (i.e. made of several pieces, even of more than three pieces), the support member 42 being in this case bolted adjacent the wheel hub, for instance.

FIG. 5A shows a wheel assembly 2" for a wheel rim 30" which is in this example of the single piece type (the wheel rim according to this embodiment could alternatively be of the multi-piece type) and which is fixed in a known way to a wheel hub 33" by a plurality of bolts 43", 44 and 45. This inventive wheel assembly 2" only differs from that of FIG. 5, in that the first and second clamp rings 12 and 22 of the respective first and second shield rings 10 and 20 are attached together and to the wheel hub 33" by fastening means 40" including an intermediate annular support member 42" which is analogous to the support member 42 of FIG. 5 but which is attached to the wheel hub 33" by bolts 43". As visible in FIG. 5A, the shield 1 is also axially distant from the axially outer rim flange 35" of the wheel rim 30".

Figure 7:
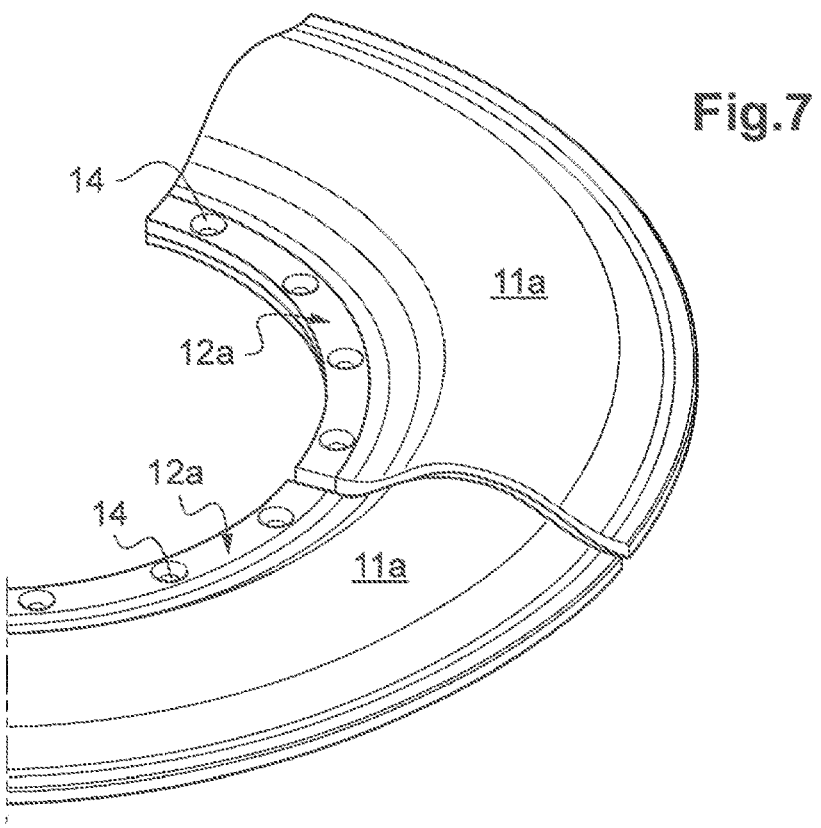

FIGS. 6 and 7 show a nearly abutting arrangement end to end with an interstice between two consecutive arcuate sectors 11a, 12a similar to those visible in FIG. 1, without contact between these consecutive sectors 11a, 12a.

FIGS. 8-9, 10-11 and 14-15 each show in pairs an overlapping abutting arrangement end to end with an overlap between the respective ends of two consecutive arcuate sectors 111a, 112a secured by mutually engaging shoulders 118 and 119 integrally formed in the end edges 118a, 118a', 118a" and 119a, 119a', 119a" of each arcuate flexible sector 111a (radially outside the arcuate rigid clamping part 112a). These shoulders 118 and 119 have the same small depth (in the axial direction of the wheel assembly), the same width (in the circumferential direction of the wheel assembly) and the same radial height equal to that of the arcuate flexible sector 111a so that, when assembled with the overlapping abutments of FIGS. 9, 11 and 15, the sectors 111a, 112a appear to be joined on either side along a radial joining line L defined by the shoulder 118 of the sector 111a, 112a which has its convex outer surface covered by the overlapping concave inner surface of the other sector 111a, 112a.

Figure 8:
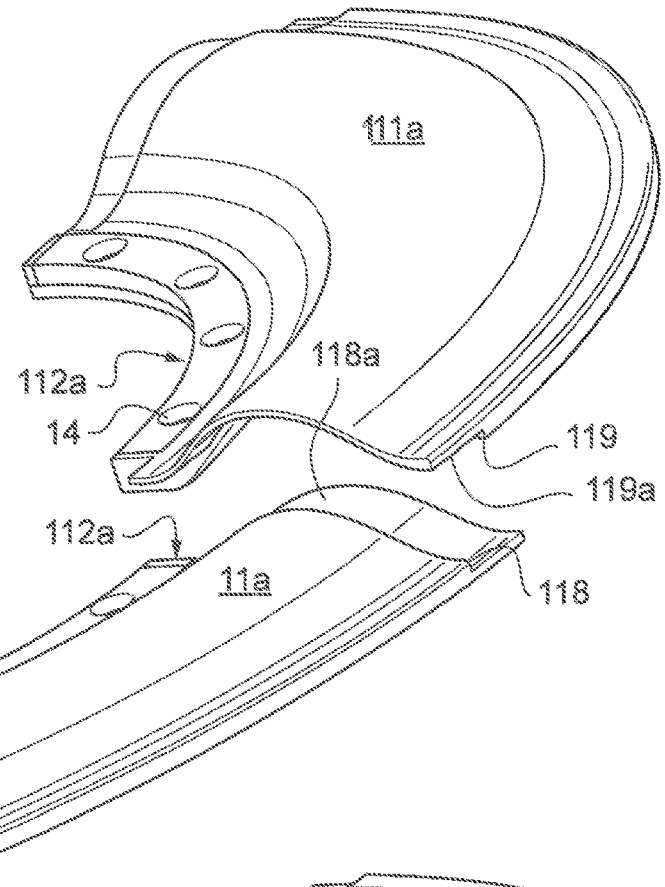
FIGS. 8 and 9 are enlarged fragmentary perspective front views, respectively exploded and assembled, of two consecutive arcuate sectors of a first or second shield ring for a protector shield according to another variant embodiment of the invention.
Figure 9:
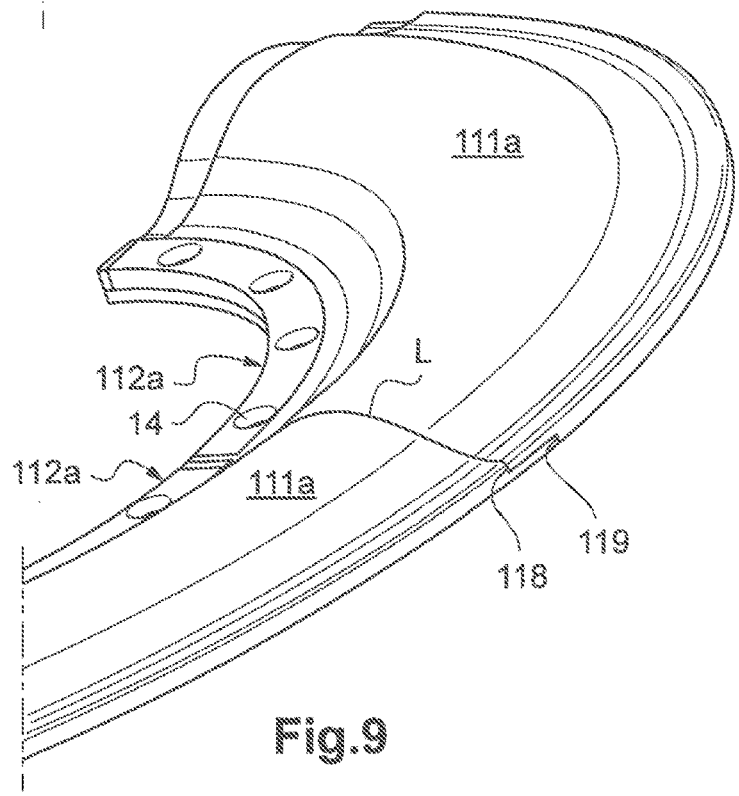
Figure 10:
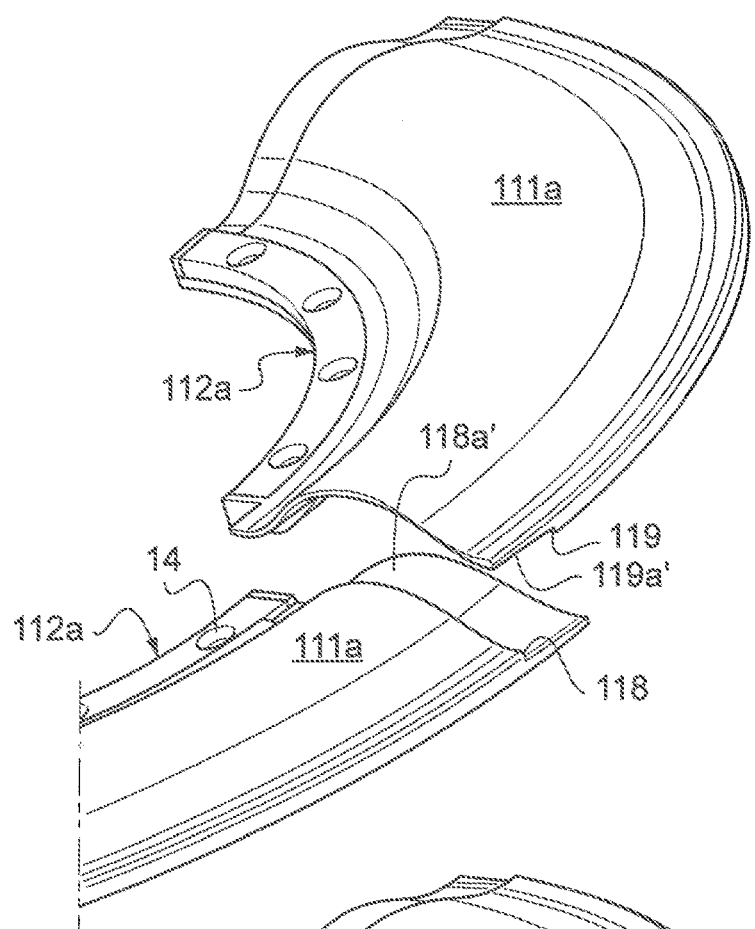
FIGS. 10 and 11 are enlarged fragmentary perspective front views, respectively exploded and assembled, of two consecutive arcuate sectors of a first or second shield ring for a protector shield according to still another variant embodiment of the invention.
Figure 11:
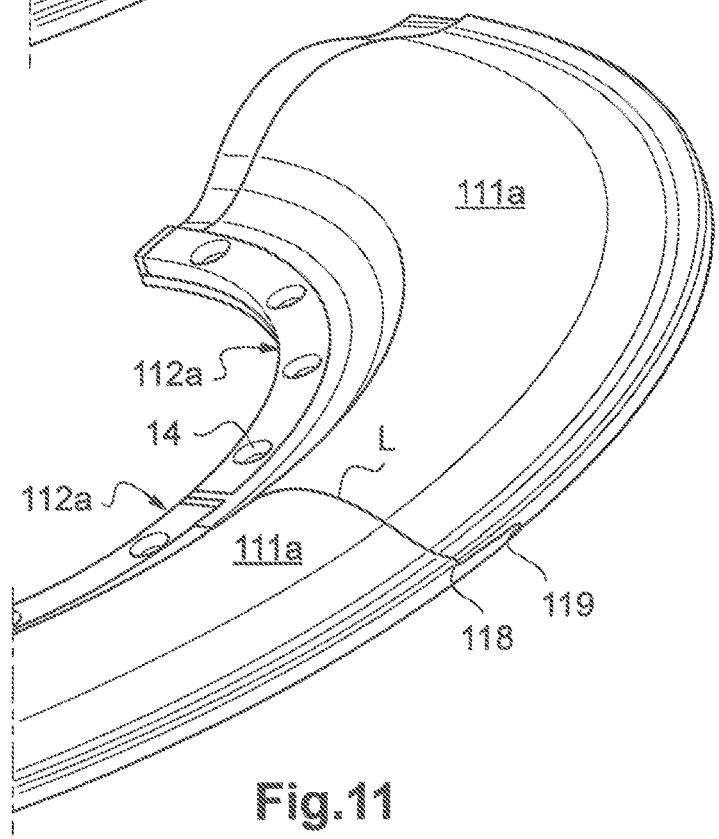
Figure 14:
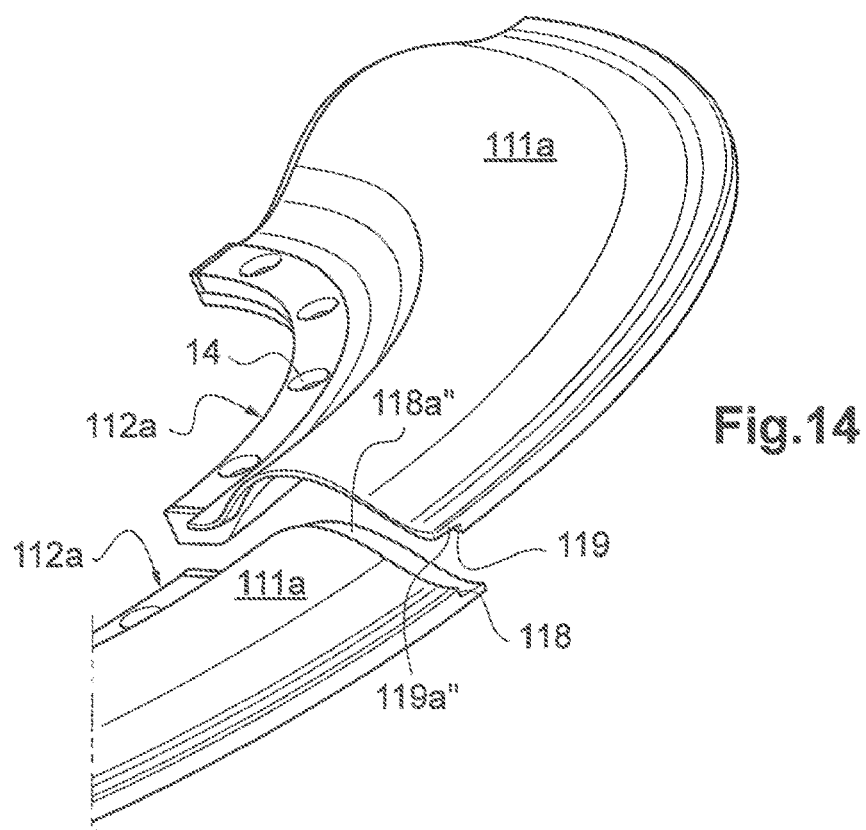
FIGS. 14 and 15 are enlarged fragmentary perspective front views, respectively exploded and assembled, of two consecutive arcuate sectors of a first or second shield ring for a protector shield according to still another variant embodiment of the invention.
Figure 15:
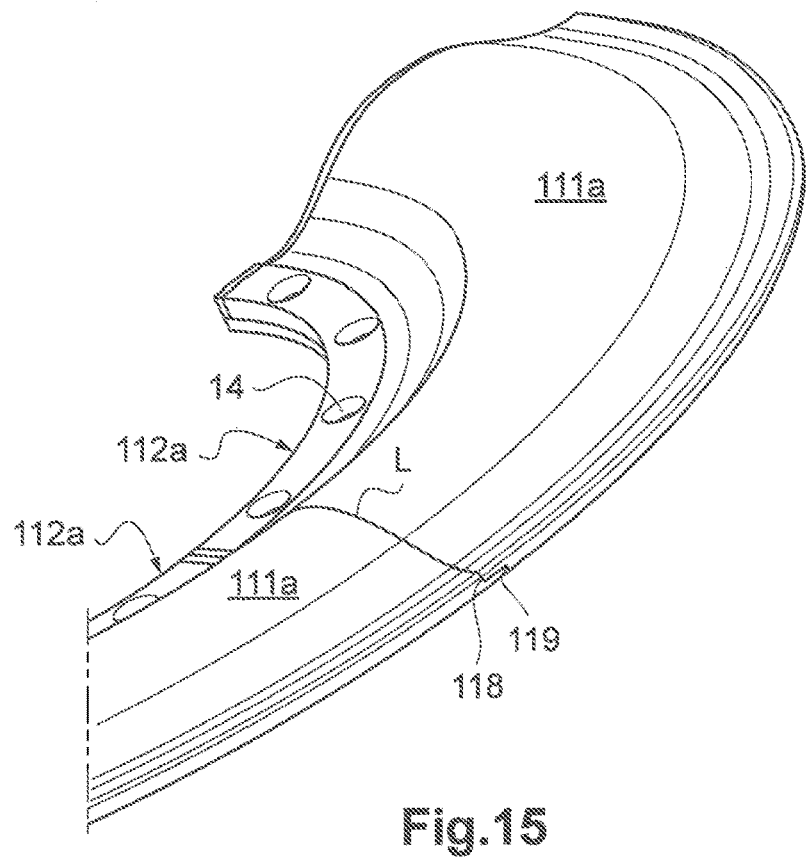

Specifically, FIGS. 8-9 show that both engaging shoulders 118 and 119 each define a right angle with the end edges 118a and 119a of the corresponding sectors 111a, 112a, whereas FIGS. 10-11 show that the shoulders 118 and 119 each define an obtuse angle with the tapered end edges 118a' and 119a' of the corresponding sectors 111a, 112a, and the obtuse shoulders 118 and 119 of FIGS. 14-15 only distinguish from those of FIGS. 10-11 in that they have a smaller width.

Figure 12:
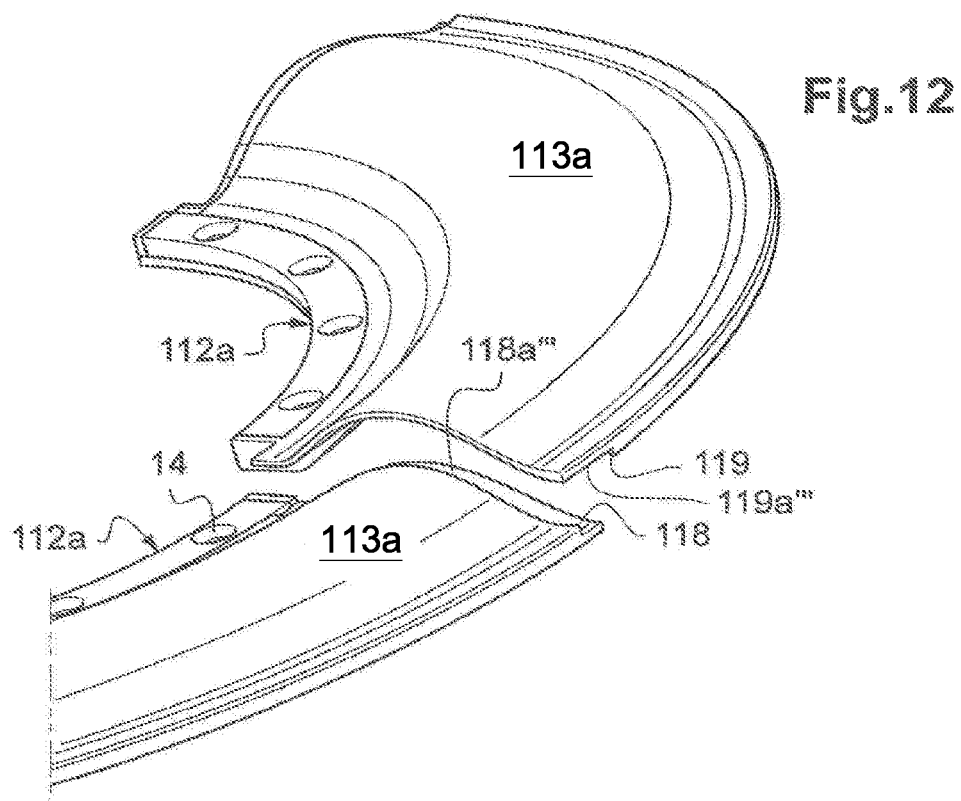
FIGS. 12 and 13 are enlarged fragmentary perspective front views, respectively exploded and assembled, of two consecutive arcuate sectors of a first or second shield ring for a protector shield according to still another variant embodiment of the invention.
Figure 13:
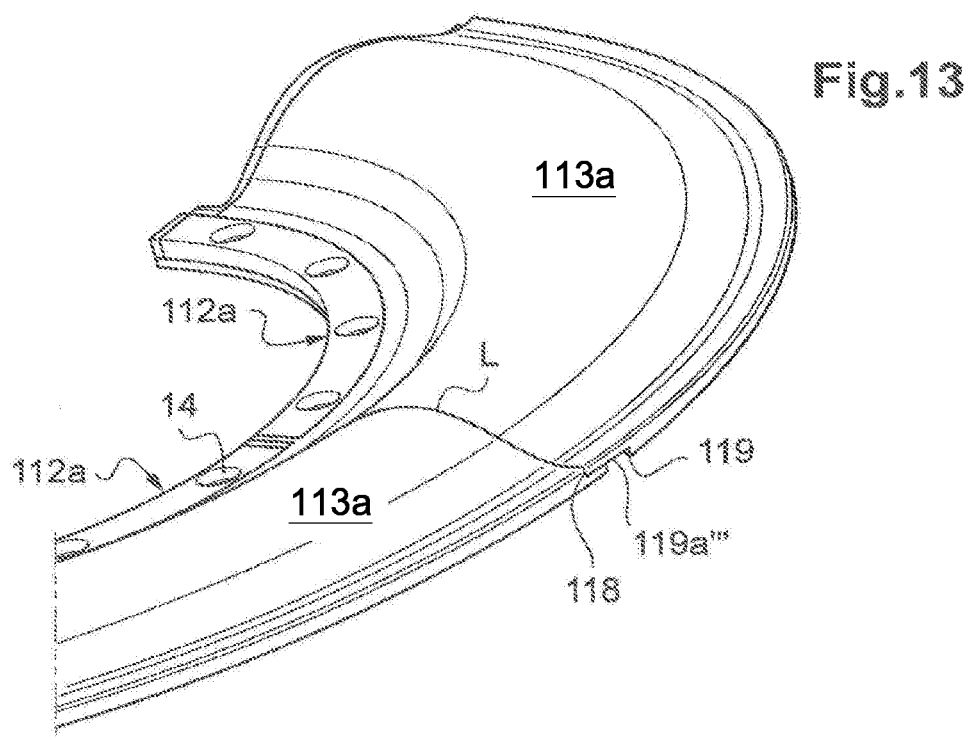

FIGS. 12 and 13 also show an overlapping abutment with an overlap between the end edges 118 a''' and 119 a''' of two consecutive arcuate sectors 113a, 112 a secured by shoulders 118 and 119 integrally formed in these end edges 118 a''' and 119 a''' and having the same axial depth and radial height, but not having the same circumferential width so that, when assembled in the overlapping abutment of FIG. 13, the sectors 113a, 112 a appear to be joined only on their convex outer side along a radial joining line L defined by the shoulder 118 of the sector 113a, 112 a which has its convex outer surface covered only by a part of the end edge 119 a''' of the concave inner surface of the other sector 113a, 112 a, whose shoulder 119 does not abut against the end edge 118 a'''.

Figure 16:
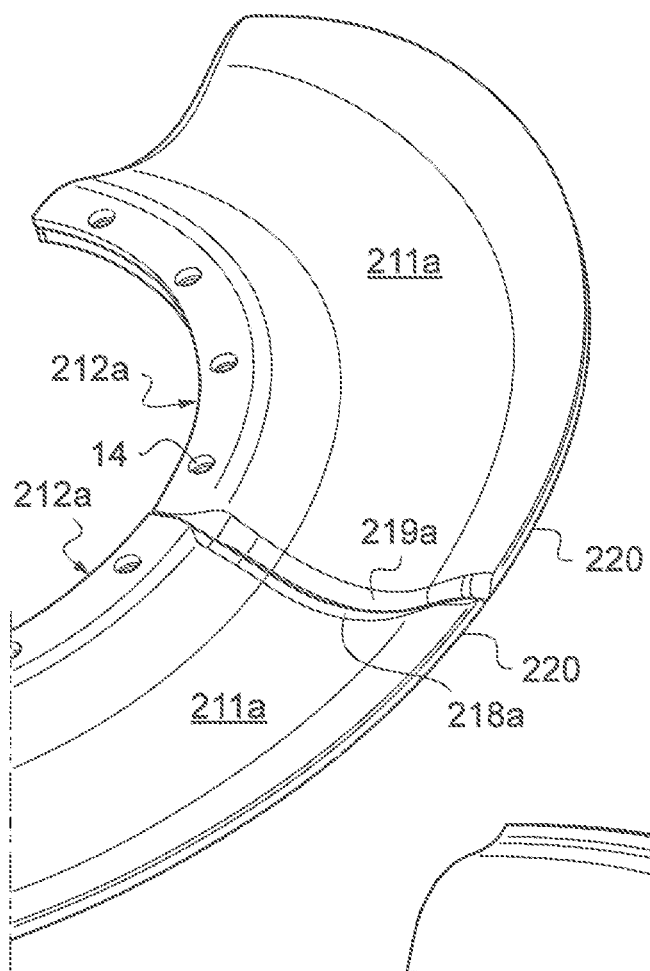
FIGS. 16 and 17 are enlarged fragmentary perspective assembled views of two consecutive arcuate sectors of a first or second shield ring for a protector shield according to still another variant embodiment of the invention, respectively showing the rear and front surfaces of these sectors.
Figure 17:
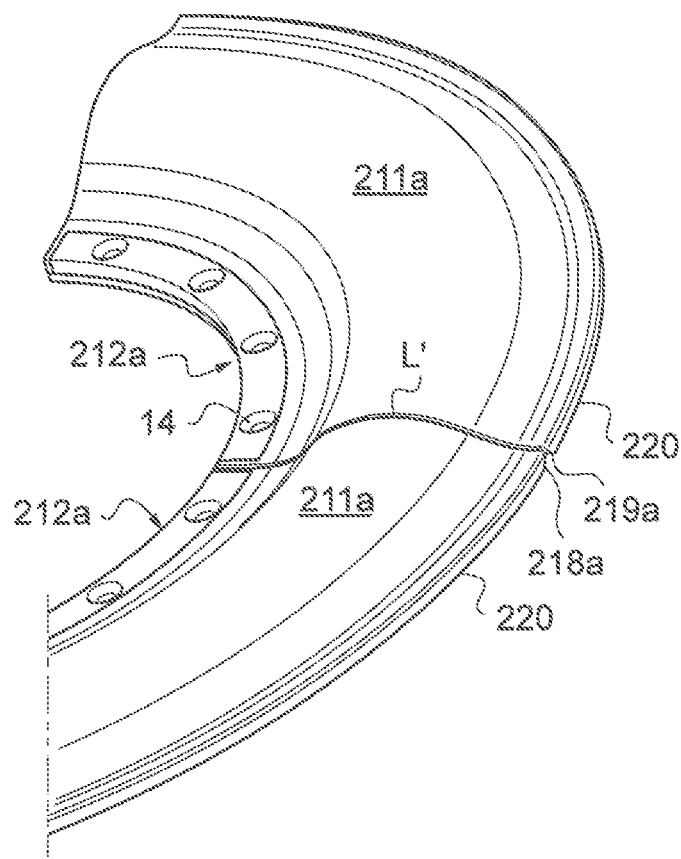

FIGS. 16-17 show a nearly abutting arrangement end to end of consecutive sectors 211a, 212a characterized in that they have respective sloping end edges 218a and 219a which, on the inner concave side of the sectors 211a, 212a, are symmetrically tapered and beveled for instance in a curved manner so as to substantially join together at their respective thinnest ends and, on the outer convex side thereof, substantially define a joining line L' at these thinnest ends. As visible in FIG. 16, these beveled edges 218a and 219a extend from the arcuate rigid clamping part 212a to the outer circumferential edge 220 of the sectors 211a, 212a with a large beveled width over the radial height of the sectors 211a, 212a.

Figure 18:
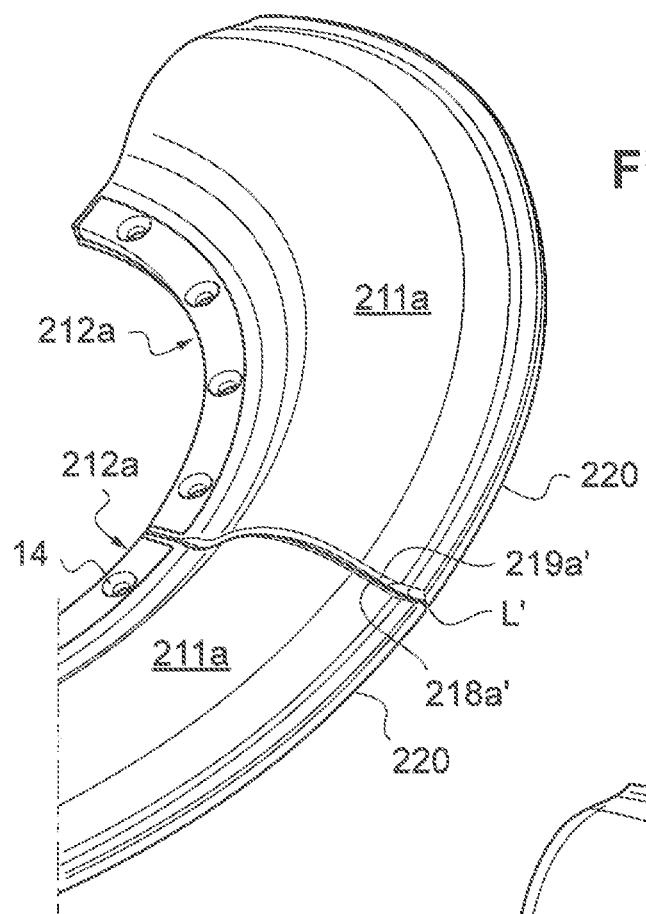
FIG. 18 is an enlarged fragmentary perspective front assembled view of two consecutive arcuate sectors of a first or second shield ring for a protector shield according to still another variant embodiment of the invention.
Figure 19:
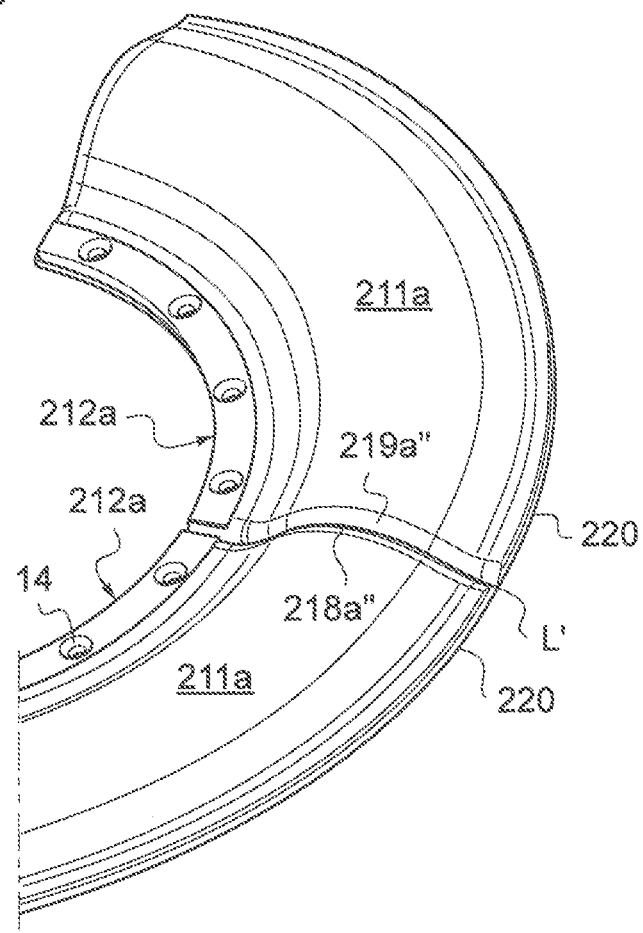
FIG. 19 is an enlarged fragmentary perspective front assembled view of two consecutive arcuate sectors of a first or second shield ring for a protector shield according to still another variant embodiment of the invention.

FIGS. 18 and 19 each also show a nearly abutment of the consecutive sectors 211a, 212a which have respective sloping end edges 218a' and 219a', 218a" and 219a" but which, on the outer convex side of the sectors 211a, 212a, define the symmetrical tapered edges 218a' and 219a', 218a" and 219a" which are beveled for instance in a curved manner so as to substantially join together at their respective thinnest ends and, on the inner concave side thereof, substantially define a joining line L' at these thinnest ends. As visible in FIG. 18, these beveled edges 218a' and 219a' extend from the arcuate rigid clamping part 212a to the outer circumferential edge 220 of the sectors 211a, 212a with a small beveled width over the radial height of the sectors 211a, 212a, whereas in FIG. 19 the beveled edges 218a" and 219a" extend over the radial height of the sole arcuate flexible part 211a with a large beveled width radially outside the arcuate rigid clamping part 212a (both consecutive assembled clamping parts 212a being spaced by an interstice in FIG. 19, contrary to the assembled flexible parts 211a which are joined together).

The arcuate sector 311a, 312a of a first and/or second shield ring 310 for a protector shield according to the variant embodiment of FIGS. 20 and 21 essentially distinguishes from the embodiment of FIGS. 1-5, in that:
- ribs 321 are formed on the inner concave surface of the sector 311a, 312a (see FIG. 21), and in that
- the sector 311a, 312a is provided with an axially extending bead 322 (see FIG. 20) which has a thickness greater than that of the rest of the arcuate flexible part 311a and which defines the outer circumferential edge 320 of this sector 311a, 312a.

In the example of FIG. 21, two radial ribs 321 are provided on the sector 311a, 312a near the two respective end edges 318a and 319a thereof designed to be mounted substantially in abutment with corresponding end edges 318a and 319a of other consecutive sectors 311a, 312a.

Alternatively, it is to be noted that an arcuate sector of a first and/or second shield ring for a protector shield according to the invention could have either this axially extending bead 322 at the outer circumferential edge 320 of this sector, or these radial ribs 321 (i.e. not necessarily the combination of this bead 322 and of these ribs 321).

What is claimed is:

1. A protector annular shield for a sidewall of a motor vehicle tire, said shield being configured to be mounted on a wheel rim receiving said tire, wherein the protector shield comprises at least two concentric shield rings comprising a first shield ring and a second shield ring which are axially juxtaposed and which respectively comprise, substantially arranged end to end in a circumferential direction, a plurality of first arcuate mechanical pieces forming first sectors and a plurality of second arcuate mechanical pieces forming second sectors which angularly overlap each other, so that an end of a given second sector and an end of a consecutive second sector which is substantially arranged end to end with said end of said given second sector are both disposed axially in front of a first sector short of both ends of said first sector.

2. The protector annular shield according to claim 1, wherein said plurality of first arcuate sectors and said plurality of second arcuate sectors are arranged in angularly staggered rows, defining an overlap angle (a) between the first sectors and the second sectors.

3. The protector annular shield according to claim 2, wherein said overlap angle being measured between an end of a first arcuate sector and an end of a second arcuate sector and n being the number of sectors of said plurality of first arcuate sectors, said overlap angle (a) is equal to 180 degrees divided by said number n.

4. The protector annular shield according to claim 1, wherein each of said plurality of first arcuate sectors comprises a first flexible arcuate protecting part and, radially inwards, a first rigid arcuate clamping part which has a first median diameter and with which said first protecting part is integrally formed, and wherein each of said plurality of second arcuate sectors comprises a second flexible arcuate protecting part and, radially inwards, a second rigid arcuate clamping part which has a second median diameter with which said second protecting part is integrally formed, the first arcuate clamping parts and the second arcuate clamping parts, when substantially arranged end to end, forming two concentric first and second clamp rings attached together and configured to be attached to said wheel rim.

5. The protector annular shield according to claim 4, wherein said first and second clamp rings are attached together and configured to be attached to said wheel rim by a plurality of threaded fasteners traversing a plurality of aligned through holes provided in each of said first arcuate clamping parts and of said second arcuate clamping parts.

6. The protector annular shield according to claim 1, wherein said plurality of first arcuate sectors and said plurality of second arcuate sectors are substantially arranged end to end in an abutting manner and are devoid of an overlapping abutment between the first sectors and also between the second sectors.

7. The protector annular shield according to claim 1, wherein at least several of said plurality of first arcuate sectors and/or at least several of said plurality of second arcuate sectors are arranged in a mutual overlapping abutment by engaging shoulders integrally formed in end edges of the consecutive arcuate sectors.

8. The protector annular shield according to claim 1, wherein at least several of said plurality of first arcuate sectors and/or at least several of said plurality of second arcuate sectors are substantially arranged in a mutual joining abutment by sloping end edges of each arcuate sector, which end edges define symmetrical tapered edges which are beveled to substantially join together the consecutive arcuate sectors at their respective thinnest ends.

9. A wheel assembly for a motor vehicle comprising a wheel rim, a tire having beads mounted respectively against axially inner and outer flanges of said rim, and the protector shield of claim 1 mounted adjacent said rim.

10. The wheel assembly according to claim 9, wherein each of said plurality of first arcuate sectors comprises a first flexible arcuate protecting part and, radially inwards, a first rigid arcuate clamping part which has a first median diameter and with which said first protecting part is integrally formed,
wherein each of said plurality of second arcuate sectors comprises a second flexible arcuate protecting part and, radially inwards, a second rigid arcuate clamping part which has a second median diameter with which said second protecting part is integrally formed, and
wherein the first arcuate clamping parts and the second arcuate clamping parts, when substantially arranged end to end, form two concentric first and second clamp rings which are attached together and to said wheel rim, said first and second clamp rings being directly attached to said axially outer flange or to an adapter ring of the wheel rim, said adapter ring extending said axially outer flange radially inwards, so that the shield is in direct contact with the wheel rim.

11. The wheel assembly according to claim 10, wherein said first and second clamp rings which are attached together and to said wheel rim by a plurality of axial threaded fasteners traversing axially aligned through holes provided in each of said first arcuate clamping parts and second arcuate clamping parts and further axially traversing said adapter ring.

12. The wheel assembly according to claim 9, wherein the wheel rim comprises several pieces fixed together in a radial junction zone,
wherein each of said plurality of first arcuate sectors comprises a first flexible arcuate protecting part and, radially inwards, a first rigid arcuate clamping part which has a first median diameter and with which said first protecting part is integrally formed,
wherein each of said plurality of second arcuate sectors comprises a second flexible arcuate protecting part and, radially inwards, a second rigid arcuate clamping part which has a second median diameter with which said second protecting part is integrally formed, and
wherein the first arcuate clamping parts and the second arcuate clamping parts, when substantially arranged end to end, form two concentric first and second clamp rings which are attached together and to said wheel rim, said first and second clamp rings being attached to an intermediate annular support member which is attached to said junction zone of the wheel rim, so that the shield is axially distant from the axially outer rim flange of the wheel rim.

13. The wheel assembly according to claim 9, wherein the wheel rim is either of the single piece or multi-piece type, the wheel rim being fixed to a wheel hub,
wherein each of said plurality of first arcuate sectors comprises a first flexible arcuate protecting part and, radially inwards, a first rigid arcuate clamping part which has a first median diameter and with which said first protecting part is integrally formed,
wherein each of said plurality of second arcuate sectors comprises a second flexible arcuate protecting part and, radially inwards, a second rigid arcuate clamping part which has a second median diameter with which said second protecting part is integrally formed, and
wherein the first arcuate clamping parts and the second arcuate clamping parts, when substantially arranged end to end, form two concentric first and second clamp rings which are attached together and to said wheel hub, said first and second clamp rings being attached to an intermediate annular support member which is attached to said wheel hub, so that the shield is axially distant from an adjacent axially outer rim flange of the wheel rim.

14. The wheel assembly according to claim 12, comprising:
said intermediate annular support member having an axially outer circumferential radial portion extended radially inwards by a circumferential connecting portion located radially under said axially outer flange, said circumferential connecting portion extending radially inwards by an axially inner circumferential radial portion,
first axial threaded fasteners traversing axially aligned through holes provided in each of said first arcuate clamping parts and second arcuate clamping parts and in said axially outer circumferential radial portion, and
second axial threaded fasteners attaching said axially inner circumferential radial portion to said wheel rim.

15. The protector annular shield according to claim 4, wherein the second median diameter is identical to said first median diameter.

16. The wheel assembly according to claim 10, wherein the second median diameter is identical to said first median diameter.

17. The wheel assembly according to claim 12, wherein the second median diameter is identical to said first median diameter.

18. The wheel assembly according to claim 13, wherein the second median diameter is identical to said first median diameter.

* * * * *